Nov. 2, 1943.  M. LIWSCHITZ  2,333,538
INDUCTION MOTOR WITH OPEN-SLOT ROTOR-WINDINGS
Filed Aug. 22, 1941

WITNESSES:
Leon M. Garman
N. W. C. Groome

INVENTOR
Michael Liwschitz.
BY O. B. Buchanan
ATTORNEY

Patented Nov. 2, 1943

2,333,538

UNITED STATES PATENT OFFICE 2,333,538

INDUCTION MOTOR WITH OPEN-SLOT ROTOR WINDINGS

Michael Liwschitz, Wilkinsburg, Pa., assignor to Westinghouse Electric & Manufacturing Company, East Pittsburgh, Pa., a corporation of Pennsylvania Application August 22, 1941, Serial No. 407,938

4 Claims. (Cl. 172—274)

My invention relates to an improved and economical rotor-construction for large-sized wound-rotor induction motors or asynchronous machines, and it has particular relation to such motors which are adapted for operation at speeds considerably below the synchronous speed, that is, with high slip.

Motors of the class to which my invention relates are invariably polyphase motors, and motors of a primary-voltage rating higher than 2,000 volts, the primary windings being preformed and insulated before the coil-sides thereof are placed in the primary slots, the insulation being adapted, of course, to the rated line-voltage of over 2,000 volts. For reasons of economy, such motors, as a practical necessity, are built with fully open stator-slots, so that the preformed primary winding coil-sides may be inserted, complete, in the open slots, in the process of building the motor.

Open slots, however, introduce losses in the useful flux, involving multiplying the air-gap length by a factor which is sometimes referred to as the Carter factor, which may have a value of the order of 1.8, or thereabouts, due to the fringing effect, or the bunching of the magnetic lines of force of the air-gap flux at the edges of the open slots, depending, of course, upon the relative widths of the open slots and the length of the air-gap. If, now, fully open slots were utilized in the rotor-core, as well as the stator-core, the two Carter factors would have to be multiplied together, resulting in a rather unreasonably large total Carter effect, in view of which it has become the standard practice to build large wound-rotor induction machines with partially closed rotor slots. Completely closed rotor-slots are usually economically impossible, in wound-rotor motors, because of the cost of threading the insulated rotor-conductors from end-to-end through the closed slots, and the cost of making the end-connections thereafter.

Partially closed rotor-slots, as heretofore used, have made it possible to push the coil-sides of the rotor-winding into the slots from the open portion thereof, but this construction has necessitated utilizing subdivided or stranded rotor-windings, at least two strands or bars in the width of the slot, and two in the depth of the slot, so that one strand can be inserted at a time, through the partially closed slot-opening. Such stranded bars or rotor-windings have to be insulated, thus both increasing the insulation-factor and decreasing the heat-transfer from the copper bars to the iron core, as compared to an unstranded construction (which would have necessitated fully open rotor-slots, so that each bar would occupy the full width of the slot).

This is the type of wound-rotor motor, with open stator-slots and partially closed rotor-slots, which has heretofore become the universally accepted standard of practice. The partial closure of the rotor slots considerably reduces the Carter factor applicable to these slots, as compared to a fully open-slot construction.

When such a motor has to be designed, however, for sustained running-periods at high slips, serious difficulties are encountered, principally due to overheating of the rotor-conductors. At high slips, the so-called skin-effect is large, resulting in or from large circulating eddy-currents flowing from top to bottom, within the depth of the rotor-bars, thus reducing the effective cross-section of the bars and increasing their resistance. This increase in the resistance of the rotor-bars, at high slips, produces more heating therein, and the poor heat-conductivity through the large amount of insulation, necessitated by the stranding or subdivision of the rotor conductors, further aggravated the heating by making it difficult for the heat to be carried away by the iron laminations of the rotor-core. Consequently, such a motor, designed for long-sustained operation at high slip, would have to have more copper in the rotor, or a greater amount of subdivision which would still further increase the poor-insulation factor, all of which would result in a considerable increase in the size of the machine and in the cost of manufacturing.

According to my invention, in special high-slip machines of the general character hereinabove discussed, I depart from the accepted design-practice of utilizing semiclosed slots in the rotor, and I build my machine with fully open slots in the rotor-core, as well as in the stator-core, however making my rotor slots as narrow as is possible and utilizing unstranded or non-subdivided rotor-conductors, that is, a conductor which, with its surrounding insulation, occupies the full width of the rotor-slot in which it is placed. In this way, I reduce the proportion of the slot-space, which is occupied by the insulation around my rotor-conductors, as compared with the previous practice involving stranded rotor-conductors, and I further increase the heat-flow from each rotor-conductor in both directions to the two sides of the slot in which it is placed, thus more effectively cooling each rotor-bar. The increase in the Carter factor due to the open slots of the rotor is not of such great importance on the particular motors in question, as in other motors of the general line of wound-rotor motors, because speed-control over a wide range is utilized only for large machines, which have a relatively large air-gap, the large air-gap reducing the bunching effect due to the open slots, and making the Carter factor smaller, for any given slot-opening, than would be the case in a machine having a smaller air-gap.

The primary object of my invention, therefore, is to produce a large wound-rotor induction motor having a fully open-slot rotor-construction, thus reducing the size of such machines and their manufacturing cost, and improving the performance or operation of such machines, particularly in regard to the greater conduction of heat away from the rotor windings during operation at high slip.

With the foregoing and other objects in view, my invention consists in the structures, parts, apparatus, combinations and systems hereinafter described and claimed and illustrated in the accompanying drawing wherein:

Figure 1:
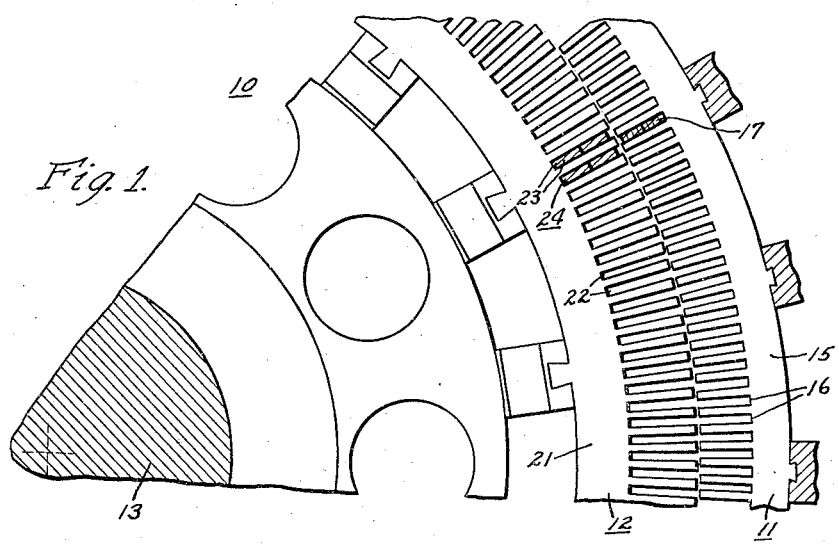
Figure 1 is a fragmentary cross-sectional view illustrating an induction motor embodying my invention.

In Fig. 1, I have illustrated a variable-speed three-phase wound-rotor induction motor or asynchronous dynamo-electric machine 10, having a stator member 11 and a rotor member 12, the latter being mounted on a shaft 13 which drives any desired load, such as a fan or blower 14. The stator member 11 is provided with a magnetizable core 15 having fully open slots 16 in which the primary winding 17 is disposed, said primary winding being formed with pre-formed coil-sides which are completely shaped and bound together and insulated before being pushed into the opening in the open stator-slots 16. The primary winding 17 is a three-phase winding having winding terminals 19 (Fig. 5) which are connected to. or adapted to be connected to, a three-phase supply-line 20, such as a 60-cycle line of usually more than 2,000 volts.

Figure 5:
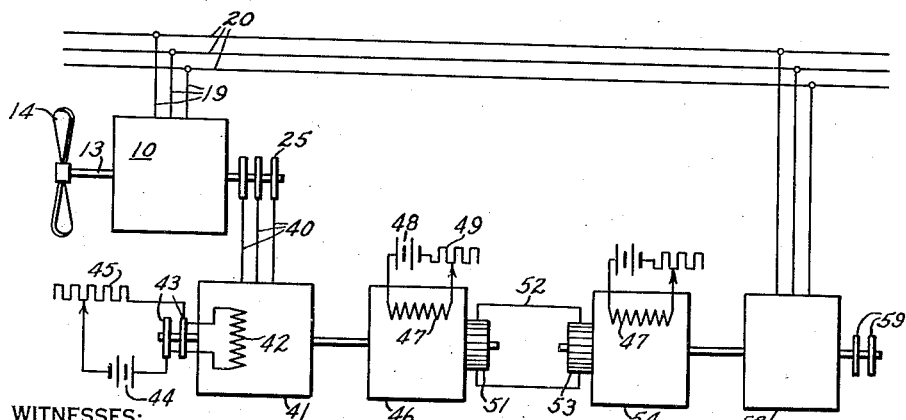
Fig. 5 is a diagrammatic view of a speed-control system in which my invention finds particular utility.

The rotor member 12 of my variable-speed induction motor 10 is provided with a magnetizable rotor-core 21 having fully open slots 22 in which are disposed the insulated conductors 23 of a two-layer wave-type secondary winding 24, the polyphase terminals of which are connected to a plurality of sliprings 25, as shown in Fig. 5. The rotor winding 24 is unique, in machines of this class, in having wide-open slots 22, so that each rotor winding-conductor or bar, with its surrounding insulation, occupies the full width of the rotor-slot in which it is placed, the rotor-winding being retained, in its slots, by means of slot-closing wedges 27.

Figure 2:
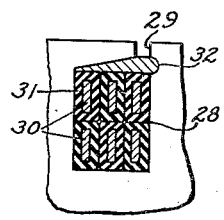
Fig. 2 is a diagrammatic representation of a partially closed rotor-slot of the prior art.
Figure 3:
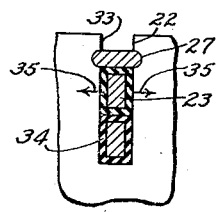
Fig. 3 is a corresponding view of a double-layer rotor-slot of my present invention.

The advantage and operation of my improved rotor construction will perhaps best be understood by a comparison of Fig. 2 and Fig. 3 of the drawing, showing, respectively, the practices of the prior art in connection with partially closed rotor-slots, with subdivided or stranded conductors, and my fully opened rotor-slots, with unstranded conductors. Thus, in Fig. 2, the rotor-slot 28 is partially closed at the air-gap, as indicated at 29, so that bunching of the lines of force which come across the air-gap from the stator member, concentrating on the edges of the slots, is not as great as if a wider slot-opening was utilized. Because of the narrowness of the width of the slot-opening 29, as compared to the width of the main body-portion of the slot 28, it is necessary to utilize subdivided or so-called stranded conductors 30, each of which is completely insulated for the secondary voltage as indicated in 31, so that two, three, or more of such insulated conductors 30—31 lie side-by-side in the width of each slot 28, and at least two layers deep, within the depth of the slot 28, the winding being retained by a slot-closing wedge 32.

The advantageous operation and effect of my winding, as shown in Fig. 3, will now readily be understood. Because my rotor-slot 22 is fully open, its opening 33, at the air gap is just as great as its width at any other portion of the slot, so that a complete unstranded rotor-winding, or bar, or coil-side 23, can be inserted in the rotor-slot 22 by being passed through the air-gap mouth-portion 33 of the slot. A comparison of Figs. 2 and 3 will show that a much smaller percentage of the entire width of the rotor-slot is taken up in the necessary winding-insulation 34, in my invention as shown in Fig. 3, than in the prior art, which is shown in Fig. 2. This not only makes it possible to use more copper in the rotor winding, for a given size of machine, but it also makes it possible to conduct heat out of each rotor-bar more directly, as indicated by the two heat-flow arrows 35 in Fig. 3. The further operation and effect of my winding will be readily understood from the explanations given in the introductory portions of this specification.

Figure 4:
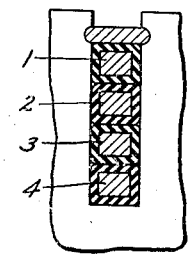
Fig. 4 is a similar view of a four-layer winding of my present invention.

While the two-layer arrangement of rotor-winding, with two bars per slot, as shown in Fig. 3, represents the least expensive form of winding, which can be utilized for a wound-rotor induction-motor, there is sometimes justification for a four-layer winding such as is shown in Fig. 4. Thus, while the two-layer winding of Fig. 3 involved coils having one coil-side lying in the top of one slot, and the other coil-side lying in the bottom of another slot, the four-layer winding of Fig. 4 may be regarded as being made up of two such double-layer windings, with the various coil-sides disposed at different heights or layers within the several slots, as indicated by the numerals 1, 2, 3, and 4. The four layers can be connected in series, that is, for example, two coil-sides of one slot may be connected in series with two coil-sides in different layers of another slot; or the four layers may be connected into two parallel-connected windings, in which case the coil-side in layer 1 of one slot will be put in series with the coil-side 3 of another slot, the layers 2 and 4 being connected in series in different slots, and both of these circuits can then be connected in parallel.

By way of illustration of a practical embodiment of my invention, I have shown an exemplary doubly-fed motor-system in Fig. 5, by the term "doubly-fed," referring to a combination in which both the primary and the secondary windings of the motor are connected to voltage-sources or translating devices other than resistances, that is, translating devices having a voltage or back-electromotive force, as distinguished from merely a voltage-drop through a resistance.

In Fig. 5, the primary-winding terminals 19 of my improved induction motor, as hereinabove described, are connected or adapted to be connected, to a polyphase supply-line 20, and the secondary-winding terminals or sliprings 25 are connected to conductors 40 which supply variable-frequency polyphase energy to a synchronous motor 41, which may have direct-current excitation 42 supplied through two sliprings 43 energized from a suitable direct-current source 44, through a field-rheostat 45. The synchronous motor 41 drives a direct-current generator 46 having an exciting field-winding 47 which may be energized from a battery 48, through a field-rheostat 49. The direct-current generator 46 has a main armature-winding which is provided with a commutator 51 from which a direct-current circuit 52 leads to the commutator 53 of a direct-current motor 54, which may be provided with field-windings 47 similar to the direct-current generator 46. The direct-current motor, in turn, drives a polyphase generator 58, which may be a synchronous machine, as indicated by the two sliprings 59, and which is adapted to supply power back to the supply-line 20.

In operation, the alternating current generator 58 of Fig. 5 is first started up from the supply-line 20, after which the main induction motor 10 is usually energized from the supply-line 20. The speed of operation of the main induction motor 10 is thereafter controlled by varying the excitation of the direct-current generator 46, which controls the amount of power which is interchanged between the two direct-current machines 46 and 54, thus controlling the amount of power which is derived from the sliprings 25 of the main induction motor 10, and returned to the line by the synchronous generator 58, thereby controlling the slip of the induction motor 10.

While I have illustrated my induction motor with an elaborate system of accurate speed-control, with the power-saving which is effected by returning the secondary-power of the induction motor to the supply-line through a double-conversion set utilizing alternating-current to direct-current conversion, and direct-current to alternating-current conversion, it will be readily understood that the speed of my induction machine might be controlled by other known speed-control means of any nature whatsoever.

I claim as my invention:

1. A wound-rotor asynchronous machine having a stator member comprising a magnetizable core having fully open slots, a polyphase primary winding having pre-formed coils insulated for an operating voltage of more than 2,000 volts and lying in said stator-slots, and a rotor member comprising a magnetizable core having fully open slots, a secondary winding lying in said rotor-slots, all of the secondary-winding conductors being in good heat-exchanging relation to the side-walls of the rotor-slots, a plurality of sliprings connected to said secondary winding in such manner as to provide polyphase terminals therefor, and circuit-means, associated with the primary winding and with the sliprings, respectively, for causing the motor to operate, for long-sustained periods, at high slip.

2. A wound-rotor asynchronous machine having a stator member comprising a magnetizable core having fully open slots, a polyphase primary winding having pre-formed coils insulated for an operating voltage of more than 2,000 volts and lying in said stator-slots, and a rotor member comprising a magneizable core having fully open slots, a two-layer wave-type secondary winding comprising two conductor-bars per slot lying in said rotor-slots, a plurality of sliprings connected to said secondary winding in such manner as to provide polyphase terminals therefor, and circuit-means, associated with the primary winding and with the sliprings, respectively, for causing the motor to operate, for long-sustained periods, at high slip.

3. A wound-rotor asynchronous machine, adapted to have a high range of speed-control when operated under doubly-fed conditions, said machine having a stator member comprising a magnetizable core having fully open slots, a polyphase primary winding having pre-formed coils insulated for an operating voltage of more than 2,000 volts and lying in said stator-slots, and a rotor member comprising a magnetizable core having fully open slots, a secondary winding lying in said rotor-slots, all of the secondary-winding conductors being in good heat-exchanging relation to the side-walls of the rotor-slots, a plurality of sliprings connected to said secondary winding in such manner as to provide polyphase terminals therefor, and doubly-fed circuit-means, associated with the primary winding and with the sliprings, respectively, for causing the motor to operate, for long-sustained periods, at high slip.

4. A wound-rotor asynchronous machine, adapted to have a high range of speed-control, when operated under doubly-fed conditions, said machine having a stator member comprising a magnetizable core having fully open slots, a polyphase primary winding having pre-formed coils insulated for an operating voltage of more than 2,000 volts and lying in said stator-slots, and a rotor member comprising a magnetizable core having fully open slots, a two-layer wave-type secondary winding comprising two conductor-bars per slot lying in said rotor-slots, a plurality of sliprings connected to said secondary winding in such manner as to provide polyphase terminals therefor, and doubly-fed circuit-means, associated with the primary winding and with the sliprings, respectively, for causing the motor to operate, for long-sustained periods, at high slip.

MICHAEL LIWSCHITZ.